United States Patent
Yang

(10) Patent No.: US 6,912,388 B2
(45) Date of Patent: Jun. 28, 2005

(54) PROVIDING ROAMING SERVICE AMONG PRIVATE MOBILE SWITCHING CENTERS

(75) Inventor: Doo-Yong Yang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 590 days.

(21) Appl. No.: 09/908,781

(22) Filed: Jul. 20, 2001

(65) Prior Publication Data

US 2002/0022481 A1 Feb. 21, 2002

(30) Foreign Application Priority Data

Aug. 18, 2000 (KR) ........................................ 2000-47872

(51) Int. Cl.$^7$ ............................ H04Q 7/20; H04M 1/00; H04M 7/00
(52) U.S. Cl. .................. 455/431.1; 455/433; 455/435.1; 455/435.2; 455/555; 379/225; 379/229; 379/231
(58) Field of Search ...................... 455/422.1, 424–425, 455/432.1, 432.2, 432.3, 433, 435.1, 435.2, 436–440, 445, 555, 560, 451, 456.2, 456.3, 432; 370/327, 331; 379/225–234, 210–212

(56) References Cited

U.S. PATENT DOCUMENTS

| | | | | |
|---|---|---|---|---|
| 5,479,483 A | * | 12/1995 | Furuya et al. ............... | 455/433 |
| 5,670,950 A | | 9/1997 | Otsuka | |
| 5,734,699 A | | 3/1998 | Lu et al. | |
| 5,818,824 A | * | 10/1998 | Lu et al. ...................... | 370/328 |
| 5,819,178 A | * | 10/1998 | Cropper ...................... | 455/433 |
| 5,887,256 A | * | 3/1999 | Lu et al. ................... | 455/426.1 |
| 5,978,678 A | * | 11/1999 | Houde et al. ................ | 455/433 |
| 6,009,328 A | * | 12/1999 | Muszynski ................... | 455/442 |
| 6,029,067 A | | 2/2000 | Pfundstein | |
| 6,070,076 A | * | 5/2000 | Valentine ..................... | 455/445 |
| 6,101,382 A | | 8/2000 | Granberg | |
| 6,175,622 B1 | | 1/2001 | Chiniwala et al. | |
| 6,285,879 B1 | * | 9/2001 | Lechner et al. ........... | 455/432.3 |
| 6,285,880 B1 | * | 9/2001 | Gagnon et al. ........... | 455/432.1 |
| 6,337,981 B1 | * | 1/2002 | Peters ...................... | 455/432.3 |
| 6,490,449 B1 | * | 12/2002 | Thibert et al. ............... | 455/433 |
| 6,683,881 B1 | * | 1/2004 | Mijares et al. .............. | 370/401 |
| 6,735,441 B1 | * | 5/2004 | Turgeon et al. .............. | 455/433 |

FOREIGN PATENT DOCUMENTS

| | | |
|---|---|---|
| WO | WO 94/16531 | 7/1994 |
| WO | WO 99/39527 | 8/1999 |

OTHER PUBLICATIONS

European Patent Office's search report dated Jan. 3, 2002.

* cited by examiner

Primary Examiner—William Trost
Assistant Examiner—Meless Zewdu
(74) Attorney, Agent, or Firm—Robert E. Bushnell, Esq.

(57) ABSTRACT

Providing a roaming service among private mobile switching centers (MSCs) interconnected to one another via a public switched telephone network (PSTN) includes connecting the private mobile switching centers to a virtual private network (VPN) via the PSTN; storing information about a mobile station registered for a private mobile communication service and associated mobile station location information in a selected private mobile switching center upon a mobile station sending a private mobile communication service registration request to the selected one of the private mobile switching centers; transmitting the mobile station information and the mobile station location information to other private mobile switching centers via the virtual private network; and the selected private mobile switching center the private mobile communication service using the stored mobile station information and mobile station location information upon the mobile station sending a private mobile communication service request to a selected one of the private mobile switching centers.

7 Claims, 4 Drawing Sheets

PROVIDING ROAMING SERVICE AMONG PRIVATE MOBILE SWITCHING CENTERS

CLAIM OF PRIORITY

This application makes reference to, incorporates the same herein, and claims all benefits accruing under 35 U.S.C §119 from an application entitled Method for Providing Roaming Service among Private Mobile Switching Centers earlier filed in the Korean Industrial Property Office on Aug. 18, 2000, and there duly assigned Ser. No. 2000-47872 by that Office.

BACKGROUND OF THE INVENTION

1. Field of the Invention

The present invention relates generally to a mobile communication system, and in particular, to providing a roaming service among private mobile switching centers.

2. Description of the Related Art

In general, private (or local) mobile switching centers (MSCs) provide the mobile communication service only to the mobile subscribers registered therein. Therefore, the mobile subscribers cannot be provided with the mobile communication service, when they move into a service area (or coverage area) of a private mobile switching center in which they are not registered. That is, a mobile subscriber registered in a certain private mobile switching center can be provided with a call originating service, a call terminating service and other additional services only in a service area of the private mobile switching center.

Utilization of a virtual private network in a mobile communication system is described in the following references, incorporated by reference herein: U.S. Pat. No. 6,029,067 to Matthias Pfundstein entitled Virtual Private Network for Mobile Subscribers; U.S. Pat. No. 6,101,382 to Christer Granberg entitled Transfer of Calling Party Identification in a Mobile Communication System; and U.S. Pat. No. 6,175,622 to Sima Chiniwala et al. entitled Virtual Private Network for a Telephone Network.

SUMMARY OF THE INVENTION

It is, therefore, an object of the present invention to provide a method of providing a roaming service among private mobile switching centers.

It is another object of the present invention to provide a method of enabling a mobile subscriber to be provided with a call terminating service and a call originating service in any service area of a plurality of private mobile switching centers.

To achieve the above and other objects, a method of providing a roaming service among private mobile switching centers (MSCs) interconnected to one another via a public switched telephone network (PSTN) is provided. The method comprises connecting the private MSCs to a virtual private network (VPN) via the PSTN; if a mobile station sends a private mobile communication service registration request to a selected one of the private MSCs, storing, by the selected private MSC, information about the mobile station registered for the private mobile communication service and associated mobile station location information; transmitting the mobile station information and the mobile station location information to other private MSCs via the VPN; and if the mobile station sends a private mobile communication service request to a selected one of the private MSCs, providing, by the selected private MSC, the private mobile communication service using the stored mobile station information and mobile station location information, and the VPN.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
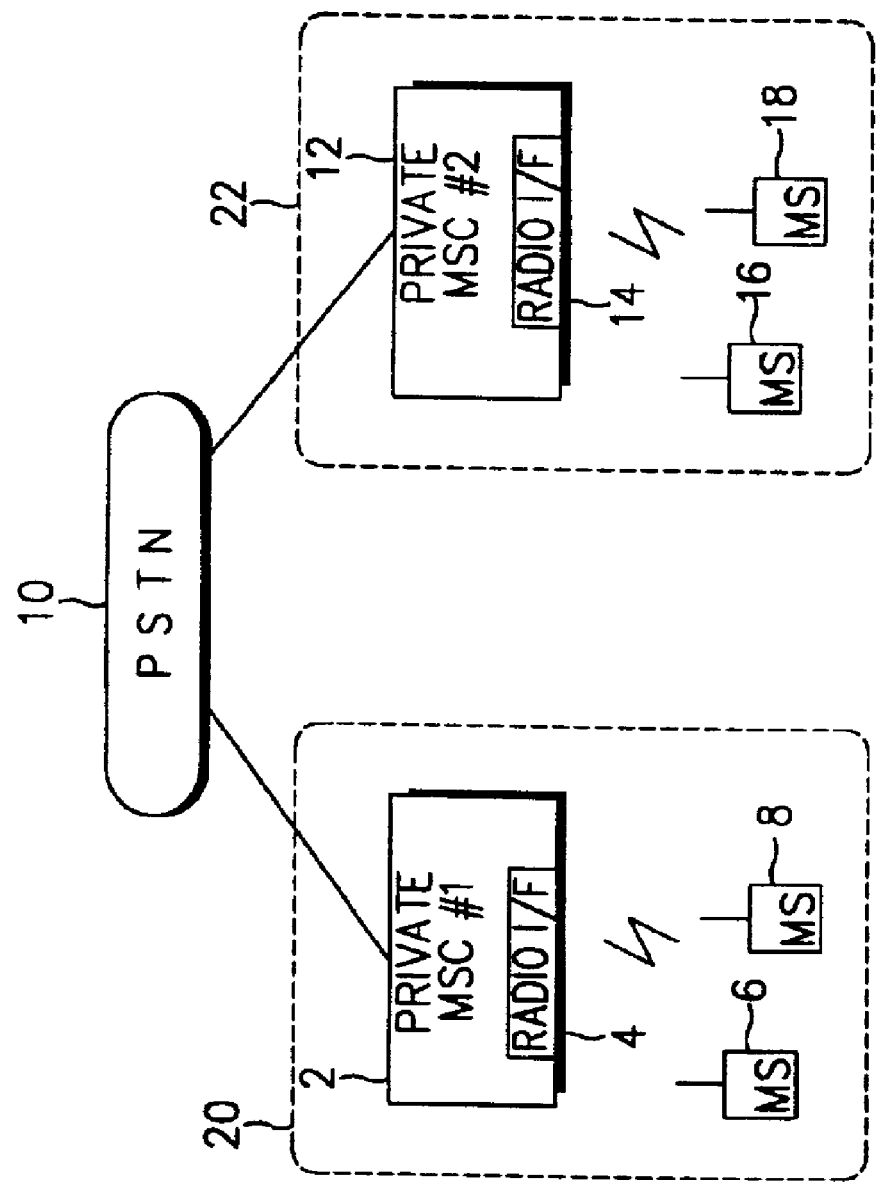
FIG. 1 is a diagram illustrating the connection between private mobile switching centers.

Referring to FIG. 1, private mobile switching centers 2 and 12 are connected in common to a public switched telephone network (PSTN) 10. Further, the private mobile switching centers (MSCs) 2 and 12 include radio interfaces (I/F) 4 and 14, respectively. The private mobile switching center 2 provides the mobile communication service only to mobile stations (MSs) 6 and 8 registered therein, while the private mobile switching center 12 provides the mobile communication service only to mobile stations 16 and 18 registered therein. Therefore, when the mobile stations 16 and 18 registered in the private mobile switching center 12 move into a service area 20 of the mobile switching center 2, they cannot be provided with the mobile communication service. Likewise, when the mobile stations 6 and 8 registered in the private mobile switching center 2 move into a service area 22 of the mobile switching center 12, they cannot be provided with the mobile communication service. The private mobile switching centers and shown in FIG. 1 are chiefly designed to manage in-building mobile switching, so that they cannot be connected to a public mobile communication network.

Figure 2:
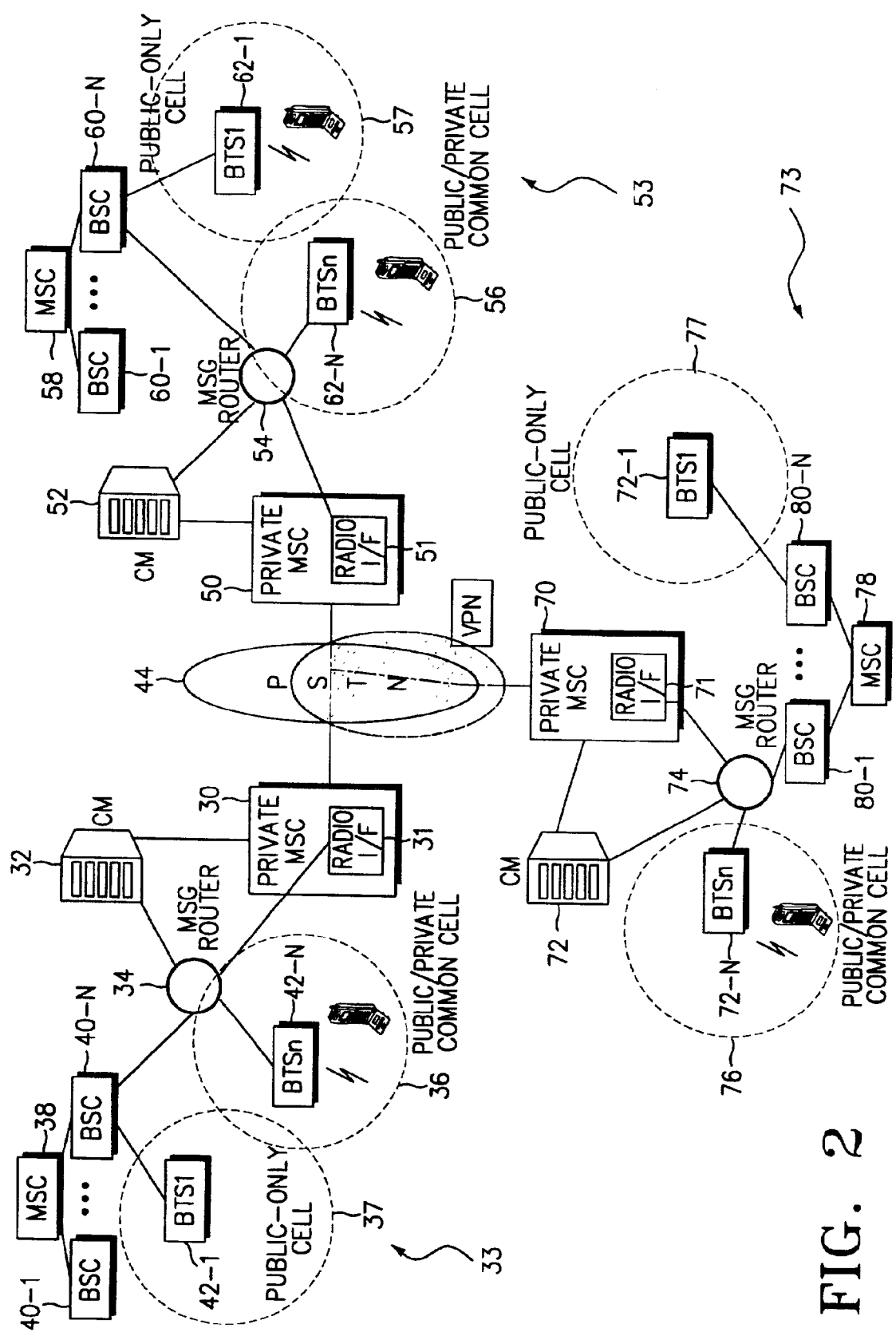
FIG. 2 is a diagram illustrating a network structure for providing a roaming service among private mobile switching centers according to an embodiment of the present invention.

FIG. 2 shows a network structure for providing a roaming service among private mobile switching centers according to an embodiment of the present invention.

Referring to FIG. 2, a public mobile communication network 33 includes a mobile switching center (MSC) 38, a plurality of base station controllers (BSCs) 40-1 to 40-N, and a plurality of base station transceiver subsystems (BTSs) 42-1 to 42-N.

A public mobile communication network 53 includes a mobile switching center (MSC) 58, a plurality of base station controllers (BSCs) 60-1 to 60-N, and a plurality of base station transceiver subsystems (BTSs) 62-1 to 62-N.

A public mobile communication network 73 includes a mobile switching center (MSC) 78, a plurality of base station controllers (BSCs) 80-1 to 80-N, and a plurality of base station transceiver subsystems (BTSs) 72-1 to 72-N. A plurality of private mobile switching centers 30, 50 and 70 are connected to the public mobile communication networks 33, 53 and 73, respectively.

As illustrated, the private mobile switching centers 30, 50 and 70 share public/private common cells 36,56 and 76 with their associated public mobile communication networks 33, 53 and 73, respectively. That is, the base station transceiver subsystems (BTSs) 42-N, 62-N and 72-N in the public/private common cells 36, 56 and 76 are commonly used for both the public mobile communication service and the private mobile communication service. The other cells serviced by the BTSs of the public mobile communication networks 33, 53 and 73, except the public/private common cells 36, 56 and 76, are used as public-only cells 37, 57 and 77, as shown in FIG. 2.

In FIG. 2, the private mobile switching centers 30, 50 and 70 include radio interfaces (I/F) 31, 51 and 71, respectively, and are connected to their associated public mobile communication networks 33, 53 and 73 via the radio interfaces 31, 51 and 71. To connect the private mobile switching centers 30, 50 and 70 to their associated public mobile communication networks 33, 53 and 73, there are provided call managers 32, 52 and 72, which include message (MSG) routers 34, 54 and 74, respectively.

In FIG. 2, the message routers 34, 54 and 74 are separated from the call managers 32, 52 and 72, for convenience of explanation. However, it is preferable that the message routers 34,54 and 74 are included in the call managers 32, 52 and 72, respectively. The message routers 34, 54 and 74 are connected to the BTSs 42-N, 62-N and 72-N in the public/private common cells 36, 56 and 76, respectively, and also connected to the base station controllers (BSCs) 40-N, 60-N and 80-N, respectively, which are upper BSCs of the BTSs 42-N, 62-N and 72-N.

In addition, the message routers 34, 54 and 74 are also connected to the private mobile switching centers 30,50 and 70, respectively. The message routers 34, 54 and 74 analyze such event messages as a call origination message, a call termination message, a location registration message and an SMS (Short Message Service) message, and then, designate a path according to the analyzed results. The message routers 34, 54 and 74 each have a router table, in which the designated path information is mapped with the associated events, and transmit a received message to a related device by consulting the router table.

The call managers 32, 52 and 72 are connected to the private mobile switching centers 30, 50 and 70 via a local area network (LAN). The call managers 32, 52 and 72 analyze the messages received from the message routers 34, 54 and 74 to determine whether the received messages are for the public mobile communication service or the private mobile communication service, and then, perform the service control according to the determined results.

Figure 3:
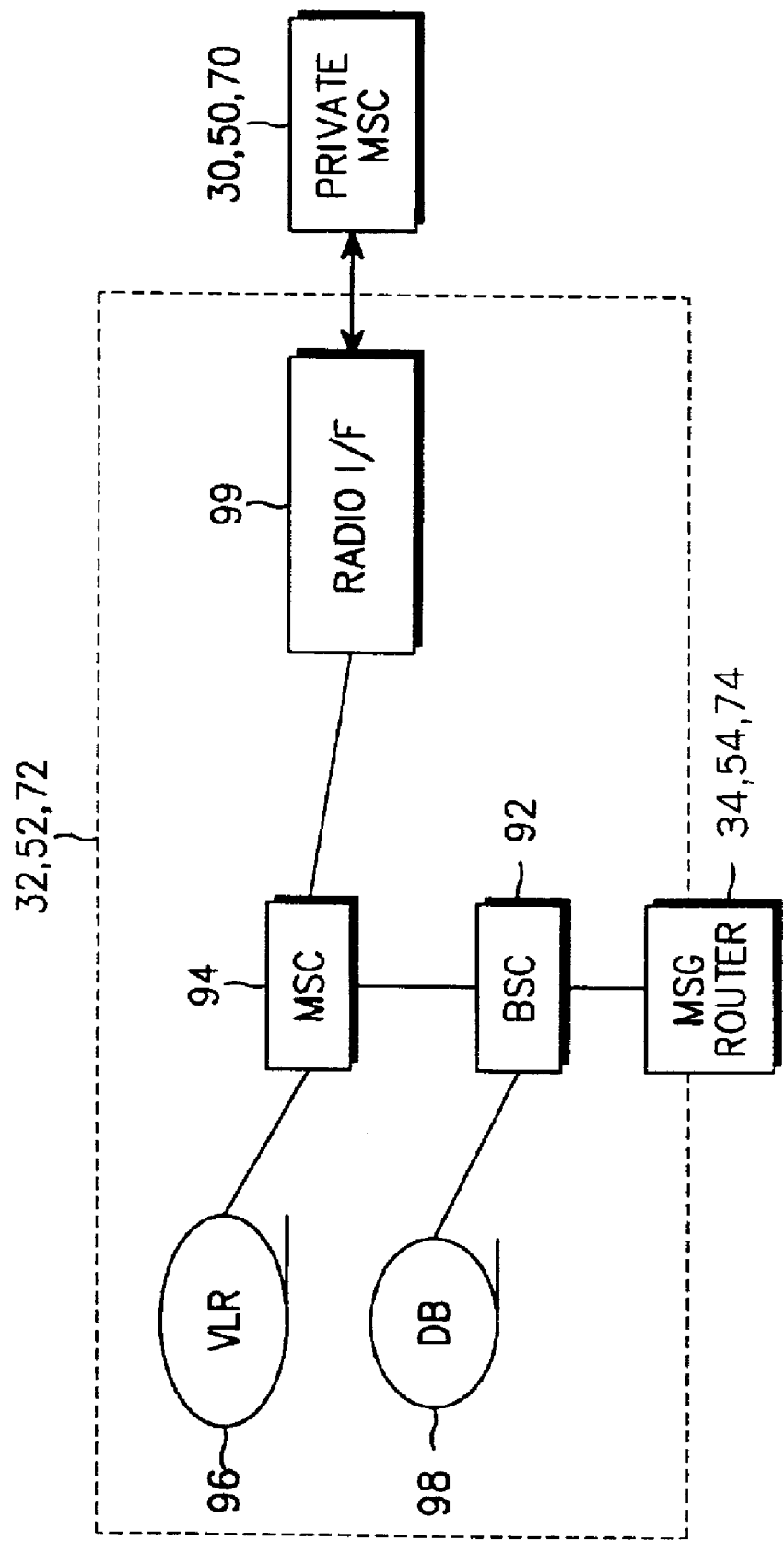
FIG. 3 is a detailed block diagram illustrating the call managers shown in FIG. 2.

FIG. 3 shows a detailed structure of the call managers 32, 52 and 72 of FIG. 2. Referring to FIG. 3, the call manager includes a private BSC 92 and a private MSC 94 corresponding to the BSC and the MSC of the public mobile communication network, and has a VLR (Visitor Location Register) 96, connected to the private MSC 94, for registering mobile stations intended to be provided with the private mobile communication service. Further, the call manager has a database (DB) 98 connected to the private BSC 92. In addition, the call manager includes a radio interface 99 connected to the private MSC 94, for communication with its associated private mobile switching center.

Turning back to FIG. 2, the private mobile switching centers 30, 50 and 70 are connected in common to the PSTN 44. In order to provide the roaming service among the private mobile switching centers 30, 50 and 70 according to an embodiment of the present invention, the private mobile switching centers 30, 50 and 70 are connected in common to a virtual private network (VPN) via the PSTN 44.

Figure 4:
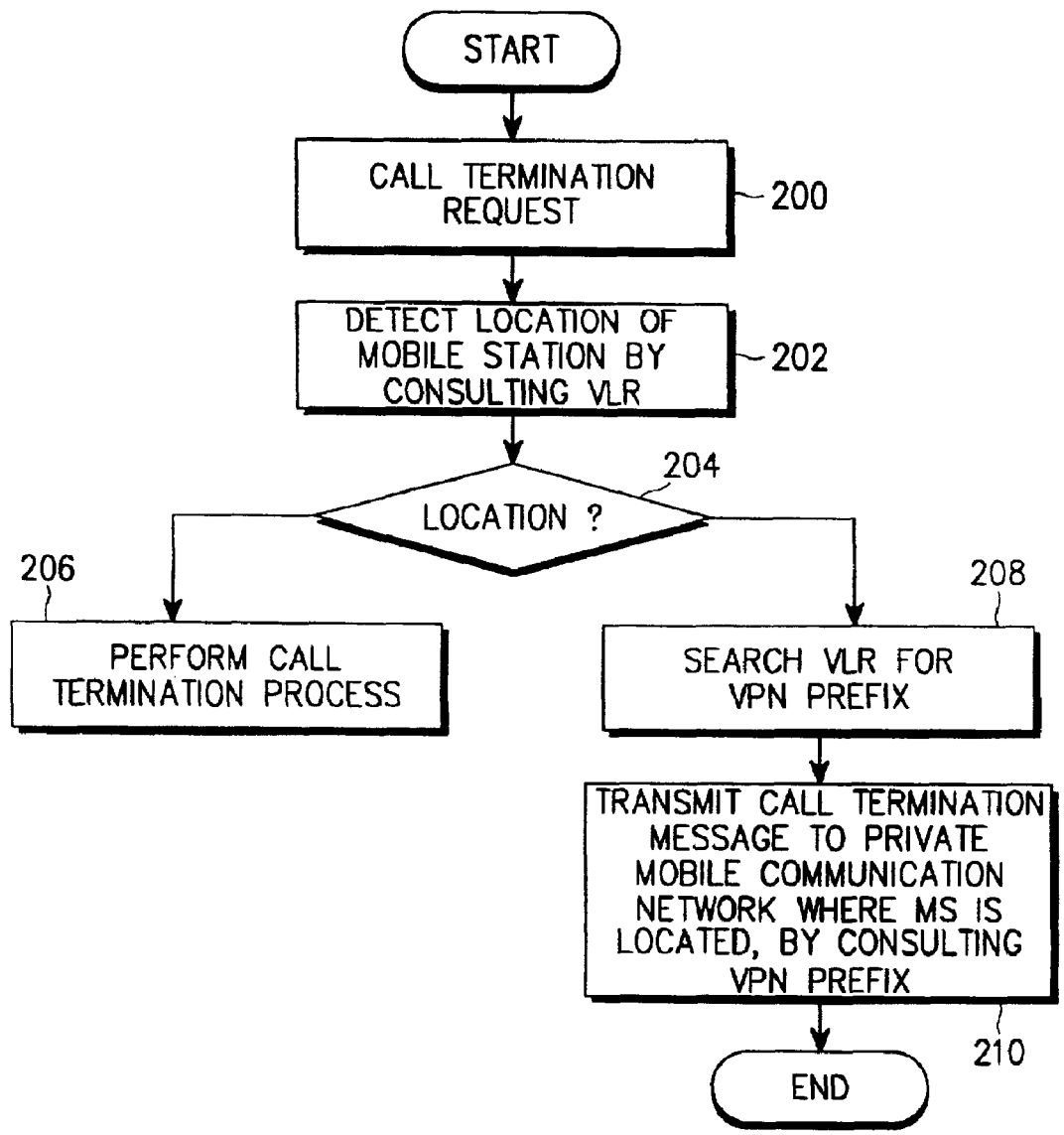
FIG. 4 is a flowchart illustrating a procedure for providing a roaming service among private mobile switching centers according to an embodiment of the present invention.

FIG. 4 shows a procedure for controlling a roaming service among the private mobile switching centers 30, 50 and 70 connected to the virtual private network.

Now, a method for providing the roaming service among the private mobile switching centers 30, 50 and 70 according to an embodiment of the present invention will be described in detail with reference to FIGS. 2 to 4.

For the roaming service among the private mobile switching centers 20, 50 and 70, information about the mobile stations registered for the private mobile communication service and location information of the registered mobile stations are stored in each VLR 96 of the call managers 32, 52 and 72 associated with the private mobile switching centers 30, 50 and 70 connected to the virtual private network.

The mobile station location information includes information about a virtual private network prefix for the private mobile switching center where the mobile station is located. After storage of the mobile station location information, the information about the mobile stations registered for the private mobile communication service and the location information of the registered mobile stations are also sent to the call managers associated with the other mobile switching centers connected to the virtual private network. The detailed description will be given below.

The call managers 32, 52 and 72 manage the mobile stations registered for the private mobile communication service using their VLR 96 shown in FIG. 3. If a new mobile station is registered for the private mobile communication service, the call manager for the associated public/private common cell provides the information about the mobile stations registered for the mobile communication service to the call managers associated with the private mobile switching centers connected to the virtual private network.

If, for example, a new mobile station located in the public/private common cell 36 is registered in the call manager 32 for the private mobile communication service, the call manager 32 provides the information about the mobile stations registered for the private mobile communication service to the call managers 52 and 72 associated with the private mobile switching centers 50 and 70 connected to the virtual private network, through the private mobile switching center 30 and the PSTN 44. The other call managers 52 and 72 then store the information about the mobile stations registered for the private mobile communication service in their VLR 96, together with the mobile station location information.

In this state, if a certain mobile station moves into a public/private common cell of another private mobile communication network, the call manager for this public/private common cell updates the mobile station location information stored in its VLR 96 through the location registration process or the call origination process, and provides the updated mobile station location information to the call managers associated with the other private mobile switching centers connected to the virtual private network. The call managers then update the mobile station location information stored in their VLR 96.

In the state where the mobile station information and the associated mobile station location information are stored and updated in the call managers 32, 52 and 72 so as to enable the roaming service among the private mobile switching centers, an originating call from the mobile station belonging to any one of the public/private common cells 36, 56 and 76 is managed in the common process for the mobile originating call.

Distinguishing the private mobile communication service from the public mobile communication service is performed by the call managers 32, 52 and 72. After a mobile communication network to provide the mobile communication service is determined by the call managers 32, 52 and 72, a message is provided to the determined mobile communication network to perform the call service.

Meanwhile, a terminating call in the public mobile communication networks 33, 53 and 73 is managed in the common call terminating process of the public mobile communication network, and the call managers 32, 52 and 72 provide the received message intact to the BTSs 42-N, 62-N and 72-N.

On the other hand, a terminating call in the private mobile communication network is provided to the call managers 32, 52 and 72. The call managers 32, 52 and 72 then receive a call termination request message in step 200 of FIG. 4, and consult their VLR 96 in step 202. More specifically, when the terminating call is provided to the MSC 94 of the call managers 32, 52 and 72, the MSC 94 acquires the location information of the corresponding mobile station by consulting the VLR 96, to thereby detect a location of the mobile station.

After step 202, the call managers 32,52 and 72 determine in step 204 whether the location of the mobile station belongs to their public/private common cells or another public/private common cell. If the location of the mobile station belongs to their public/private common cells, the call managers 32, 52 and 72 perform the call termination process in step 206.

Otherwise, if the location of the mobile station belongs to another public/private common cell, a call termination message is provided to the corresponding mobile station through the roaming service among the private mobile switching centers according to an embodiment of the present invention. More specifically, if it is determined in step 204 that the location of the mobile station belongs to another public/private common cell, the call managers 32, 52 and 72 search in step 208 the VLR 96 for a virtual private network prefix corresponding to the private mobile communication network where the mobile station is located.

Thereafter, in step 210, the call managers 32, 52 and 72 transmit the call termination message to the private mobile communication network where the mobile station is located, by consulting the searched virtual private network prefix.

More specifically describing the operation performed in step 210, the call managers 32, 52 and 72 transmit the call termination request message to a target private mobile switching center in the private mobile communication network where the mobile station is located, through their associated message routers 34, 54 and/or 74, private mobile switching centers and the PSTN. The call manager for the target mobile switching center then performs the call terminating service through steps 200 to 206.

As described above, the mobile subscriber registered in both the public mobile communication network and the private mobile communication network can be provided with the call originating service, call terminating service and other additional services, when the mobile subscriber moves to any cell where the private mobile switching center sharing the public/private common cell with the public communication network is connected to the virtual private network. In addition, it is also possible to service not only a call terminated in a specific area but also a call terminated in another area through the PSTN.

While the invention has been shown and described with reference to a certain preferred embodiment thereof, it will be understood by those skilled in the art that various changes in form and details may be made therein without departing from the spirit and scope of the invention as recited by the appended claims. That is, although the invention has been described with reference to the roaming service among the private mobile switching centers in a system providing both the public mobile communication service and the private mobile communication service, the invention can also be applied to a roaming service among the private mobile switching centers connected to the virtual private network.

What is claimed is:

1. A method comprising:
    connecting private mobile switching centers to a virtual private network via a public switched telephone network;
    storing information about a mobile station registered for a private mobile communication service and associated mobile station location information in a selected one of the private mobile switching centers upon a mobile station sending a private mobile communication service registration request to the selected private mobile switching center;
    transmitting the mobile station information and the mobile station location information from the selected private mobile switching center to other private mobile switching centers via the virtual private network; and
    providing a private mobile communication service using the stored mobile station information and mobile station location information with a selected one of the private mobile switching centers and the virtual private network upon the mobile station sending a private mobile communication service request to the selected private mobile switching center.

2. A method comprising:
    connecting private mobile switching centers to a virtual private network via a public switched telephone network;
    storing information about a mobile station registered for a private mobile communication service and associated mobile station location information in a selected one of said private mobile switching centers upon said mobile station sending a private mobile communication service registration request to said selected one of said private mobile switching centers via a base station transceiver subsystem shared by the public switched telephone network and a private mobile communication network associated with the select one of said private mobile switching centers;
    transmitting the mobile station information and the mobile station location information from said select one of said private mobile switching centers to other private mobile switching centers via the virtual private network; and
    transmitting the private mobile communication service to said mobile station using is the stored mobile station information and mobile station location information with a predetermined one of said private mobile switching centers and the virtual private network upon said mobile station sending a private mobile communication service request to said predetermined one of the private mobile switching centers via one of a plurality of base station transceiver subsystems shared by the public switched telephone network and the private mobile communication networks.

3. A method comprising:

providing a plurality of private mobile switching centers, each having associated call managers and an associated common cell area for public and private network communications, each of said private mobile switching centers being connected to in common to a virtual private network via a common public switching telephone network;

registering said mobile station in one of said call managers associated with a predetermined one of said private mobile switching centers for private mobile communication service upon said mobile station being in the associated common cell area of said predetermined one of said private mobile switching centers;

providing information about said mobile station from said one of said call managers associated with said predetermined one of said private mobile switching centers to the other call managers associated with the other private mobile switching centers connected to in common to said virtual private network via said common public switching telephone network;

storing said information of said mobile station in said other call managers to enable a roaming service to said mobile station among said plurality of private mobile switching centers upon said mobile station moving to the common cell areas respectively associated with the private mobile switching centers.

4. A method, comprising:

connecting a plurality of mobile switching centers to a virtual private network via a public switched telephone network;

storing information about a mobile station registered for a private mobile communication service and associated mobile station located information at a selected one of a plurality of private mobile switching centers upon said mobile station sending a private mobile communication service registration request to said selected one of said private mobile switching centers via a base station transceiver subsystem shared by a public mobile communication network and a private mobile communication network associated with the selected one of said private mobile switching centers;

transmitting the mobile station information and the mobile station location information from said selected one of said private mobile switching centers to the remaining ones of said plurality of private mobile switching centers via a virtual private network; and providing the private mobile communication service to said mobile station with a predetermined one of said private mobile switching centers using the stored mobile station information and mobile station location information and the virtual private network upon said mobile station sending a private mobile communication service request to said predetermined one of the private mobile switching centers via one of a plurality of base station transceiver subsystems shared by the public mobile communication network and the private mobile communication networks.

5. The method of claim 4, further comprising:

providing the plurality of private mobile switching centers with associated call managers and an associated common cell area for public and private network communications and connecting each of said private mobile switching centers in common to a virtual private network via a common public switching telephone network;

registering said mobile station in one of said call managers associated with a predetermined one of said private mobile switching centers for private mobile communication service, upon said mobile station being in the associated common cell area of said predetermined one of said private mobile switching centers;

providing information about said mobile station from said one of said call managers associated with said predetermined one of said private mobile switching centers to the other call managers associated with the other private mobile switching centers connected to in common to said virtual private network via said common public switching telephone network; and storing said information of said mobile station in said other call managers to provide a roaming service to said mobile station among said plurality of private mobile switching centers when said mobile station moves to the common cell areas respectively associated with the private mobile switching centers.

6. A system, comprising:

a plurality of private mobile switching centers, associated with a corresponding plurality of private mobile communication networks, adapted to be interconnected to one another via a public switched telephone network;

an interface adapted to connect the private mobile switching centers to a virtual private network via said public switched telephone network;

a memory adapted to store information about a mobile station registered for a private mobile communication service and associated mobile station location information at a selected one of said private mobile switching centers upon said mobile station sending a private mobile communication service registration request to said selected one of said private mobile switching centers via a base station transceiver subsystem shared by the public mobile communication network and a private mobile communication network associated with the selected one of said private mobile switching centers;

a transmitter adapted to transmit the mobile station information and the mobile station location information from said selected one of said private mobile switching centers to the remaining private mobile switching centers via the virtual private network; and a controller adapted to provide the private mobile communication service to said mobile station with a predetermined one of said private mobile switching centers using the stored mobile station information and mobile station location information and the virtual private network upon said mobile station sending a private mobile communication service request to said predetermined one of the private mobile switching centers via one of a plurality of base station transceiver subsystems shared by the public mobile communication network and the private mobile communication networks.

7. The system of claim 6, further comprising:

a plurality of call managers respectively associated with the plurality of private mobile switching centers; and a register adapted to register said mobile station in one of said call managers associated with a predetermined one of said private mobile switching centers for private mobile communication service upon said mobile station being in the associated common cell area of said predetermined one of said private mobile switching centers;

wherein the plurality of private mobile switching centers include an associated common cell area for public and private network communications and each of said private mobile switching centers is connected in common to a virtual private network via the common public switching telephone network;

wherein the controller is further adapted to provide from said one of said call managers associated with said predetermined one of said private mobile switching centers information about said mobile station to the other call managers associated with the other private mobile switching centers connected to in common to said virtual private network via said common public switching telephone network; and wherein said memory is further adapted to store said information of said mobile station in said other call managers to provide a roaming service to said mobile station among said plurality of private mobile switching centers when said mobile station moves to the common cell areas respectively associated with the private mobile switching centers.

* * * * *